(12) United States Patent
Dow et al.

(10) Patent No.: US 6,441,927 B1
(45) Date of Patent: Aug. 27, 2002

(54) APPLIANCE AND METHOD FOR VIEWING CAPTURED IMAGES

(75) Inventors: James C. Dow, Fort Collins; Dan L. Dalton, Greeley; Michael L. Rudd, Fort Collins; Karin C. Ruffatto, Fort Collins; Beth Moses, Fort Collins, all of CO (US); Daniel Formosa, Montvale, NJ (US); Sandra Nieves; Paul Hamburger, both of New York, NY (US); Michael J. DeVries, Loveland; Nancy Shepard, Arvada, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/131,258

(22) Filed: Aug. 7, 1998

(51) Int. Cl.⁷ ............................................... H04L 1/024
(52) U.S. Cl. ........................ 358/473; 382/313; 345/349
(58) Field of Search ................................ 358/473, 483, 358/585; 382/313, 321, 61; 345/349, 339, 145, 439, 435, 348

(56) References Cited

U.S. PATENT DOCUMENTS

| | | | |
|---|---|---|---|
| 3,993,865 A | * 11/1976 | Browne | 178/7.6 |
| 4,984,152 A | 1/1991 | Muller | 364/200 |
| 5,550,938 A | * 8/1996 | Hayakawa | 382/313 |
| 5,706,050 A | 1/1998 | Nishimura et al. | 348/97 |
| 5,715,416 A | 2/1998 | Baker | 395/349 |
| 5,854,694 A | * 12/1998 | Payne | 358/473 |
| 6,023,535 A | * 2/2000 | Aoki | 382/299 |
| 6,063,030 A | * 3/2000 | Vara | 600/437 |

FOREIGN PATENT DOCUMENTS

| | | | |
|---|---|---|---|
| EP | 0559376 A | 9/1993 | H04N/1/41 |
| EP | 0785664 A2 | 7/1997 | H04N/1/03 |
| JP | 09/116736 | 5/1997 | H04N/1/387 |
| WO | WO93/20536 A | 10/1993 | G06K/11/18 |
| WO | WO95/28800 A | 10/1995 | H04N/1/107 |

* cited by examiner

Primary Examiner—Jerome Grant, II
Assistant Examiner—Negussie Worku (57) ABSTRACT

An appliance and method are provided for capturing and viewing images. The capturing and viewing appliance is an instrument used to capture and communicate images to other appliances and devices with communication capabilities. The capturing and viewing appliance includes a processor for manipulating and viewing the images on a built-in display. Program code stored in internal memory includes a viewing application program which allows the user to view stored images in a variety of pixel resolutions. According to another aspect of the invention, the viewing system provides a user-friendly interface for effective graphical communication of the functioning of the appliance or other device to the user through use of animated transitions. Through the use of metaphorical icons, animated transitions between exploded and unexploded images and image magnification, the present invention presents a novel user interface which makes the viewing system and method a solution to devices in need of image viewing capabilities with limited resources. The viewing method is designed for viewing captured images through instrument reuse especially useful in portable hand-held appliances or other devices which are capable of displaying images where space and compactness are a concern.

4 Claims, 9 Drawing Sheets

APPLIANCE AND METHOD FOR VIEWING CAPTURED IMAGES

CROSS REFERENCE TO RELATED APPLICATIONS

This application is related to U.S. application entitled "APPLIANCE AND METHOD OF USING SAME HAVING A SEND CAPABILITY FOR STORED DATA" Ser. No. 09/130,869, U.S. application entitled "APPLIANCE AND METHOD OF USING SAME HAVING A USER HELP CAPABILITY" Ser. No. 09/130,080, U.S. application entitled "APPLIANCE AND METHOD OF USING SAME FOR CAPTURING IMAGES" Ser. No. 09/130,573, U.S. application entitled "APPLIANCE AND METHOD OF USING SAME HAVING A DELETE CAPABILITY FOR SAVED DATA" Ser. No. 09/130,081, U.S. application entitled "APPLIANCE AND METHOD OF USING SAME HAVING A CAPABILITY TO GRAPHICALLY ASSOCIATE AND DISASSOCIATE DATA WITH AND FROM ONE ANOTHER" Ser. No. 09/130,789, U.S. application entitled "APPLICATION AND METHOD FOR COMMUNICATING AND VIEWING MULTIPLE CAPTURED IMAGES" Ser. No. 09/130,081, U.S. application entitled "APPLIANCE AND METHOD FOR NAVIGATING AMONG MULTIPLE CAPTURED IMAGES AND FUNCTIONAL MENUS" Ser. No. 09/130,584, U.S. application entitled "APPLIANCE AND METHOD FOR CAPTURING IMAGES HAVING A USER ERROR INTERFACE" Ser. No. 09/130,572, and U.S. application entitled "APPLIANCE AND METHOD FOR MENU NAVIGATION" Ser. No. 09/130,868, which are filed contemporaneously herewith and are incorporated herein by reference.

BACKGROUND OF THE INVENTION

1. Field of the Invention

The present invention generally relates to the field of digital capturing and, more particularly, relates to a user interface for a portable hand-held capturing and communicating appliance for capturing and manipulating images through digital scanning or other means of capturing and communicating those images to other devices.

2. Related Art

Intangible information is a vital business asset that can be exploited for competitive advantage if managed properly. In the past fifteen years, improvements in information processing have been achieved primarily from the widespread use of microcomputers in the workplace and their application in local and wide area networks. Through such applications as electronic mail (email) and networked access to document storage servers, the electronic communications market has exploded. Nevertheless, business is still far from reaching a "paperless" workplace. For example, according to a 1993 report by BIS Strategic Decisions (hereinafter BIS), an information technology consulting firm, more than 90 billion documents were created in 1992 and more than 1 trillion copies of those documents were made. Moreover, BIS estimated that printing and copying expenses average between 6% and 13% of a typical company's revenue. These statistics illustrate the economic savings available for those businesses that are able to merge paper and technology in a unified information processing strategy.

One tool that has proven useful for translating between paper and electronic information is the digital scanner. Scanner-enabled document distribution endows paper-based documents with the speed and convenience of electronic communications. A desktop scanner or network scanner allows business professionals to scan paper-based documents, manage them effectively and distribute them in a timely fashion. Users can share and distribute information easily by scanning directly to their email or PC fax applications. The growing popularity of fax modems and email is driving the acceptance of scanner-enabled document distribution in offices of all sizes. Fax/modem capabilities, which are available with virtually all modem PCs, enable users to send and receive faxes directly from a computer—at their desk or while traveling—and to check email remotely.

Nevertheless, while scanners are ideal for users who need to disseminate paper-based information to colleagues through PC facsimile and/or email, traditional flatbed scanners lack the convenience and flexibility that users have become accustomed to through such products as notebook computers and cellular phones. Hand-held scanners are an improvement in this regard; however, they are typically dependent on a host computer for displaying the scanned images and for providing power. U.S. Pat. No. 5,550,938 to Hayakawa et al. (hereinafter Hayakawa) discloses a portable image scanner designed to overcome these disadvantages. Specifically, Hayakawa discloses a hand-held cordless image scanner having a display/control screen, a memory for storing scanned images, a self contained power supply and an interface that allows the scanner to be received by a host computer as a memory card for transferring stored images from the scanner to the computer. While Hayakawa's scanner is effective in breaking the dependency on a host computer for image display and power, it still has several drawbacks. For example, Hayakawa's scanner offers no image processing features other than the capabilities of storing or discarding a newly scanned image and reviewing those images that have been stored previously. More advanced image processing would necessarily be done after transfer to a host computer. Moreover, Hayakawa does not offer a graphical user interface (GUI) containing icons and/or animations to assist users in operating their device. Finally, transfer of images is limited to those devices having ports for receiving an external memory card or the capability of reading the scanner memory through a memory card drive.

Accordingly, a heretofore unaddressed need exists in the industry for providing a hand-held image capturing device, system and method that allows users to view, manipulate and process scanned images in the device before transfer, and the ability to communicate directly with some other unit such as a computer, printer, or facsimile machine. In addition, the capturing device should provide cordless operation and use a standard interface for transferring images to other devices. A GUI is preferred to assist users, particularly novices, in operating the device.

SUMMARY OF THE INVENTION

The present invention overcomes the inadequacies and deficiencies of the prior art as discussed hereinbefore. The present invention provides an image capturing appliance incorporating a viewing system and method for communicating with and allowing the user to view captured images on the appliance. The viewing system and method facilitate ease of use and hardware simplification and miniaturization of the capturing appliance for seamless integration of the appliance into a consumer's existing tools and processes.

The capturing appliance contains a capturing means, such as an array of photocells, and a storage means for storing captured images. A processing means is also provided for processing the acquired image and displaying it on a self-contained display of the appliance. Program instructions are provided in the memory of the appliance which allows the user to view and manipulate the captured image in a variety of pixel resolutions on the display of the appliance.

The viewing system and method provides a user interface incorporating an on-screen icon, a three-button press zoom of the image, and navigation buttons for designating specific areas of a scanned image to be viewed. Also included are animated transitions to communicate the manipulation of pixel resolutions on the display of the captured image to the user.

The viewing system and method of the present invention have many advantages, a few of which are delineated hereafter, as examples.

An advantage of the viewing system and method of the present invention is that they provide a simple procedure for zooming into a specific area of an image so that a single button can enable the user to view the image in a plurality of pixel resolutions (dots-per-inch; dpi).

Another advantage of the viewing system and method of the present invention is that they provide a more flexible and user friendly procedure for inspecting any area of an image.

Another advantage of the viewing system and method of the present invention is that they allow inspection of an image to verify quality and content and to identify mistakes in the capturing process.

Another advantage of the viewing system and method of the present invention is that they have the ability to orient the page for easier viewing.

Another advantage of the viewing system and method of the present invention is that they provide a novel way of communicating functionality to the user through the use of animation.

Another advantage of the viewing system and method of the present invention is that they provide for a procedure for viewing an image which is simple, easy to learn and efficient.

Another advantage of the viewing system and method of the present invention is that they can be employed in virtually any graphical user interface (GUI).

Other features and advantages of the present invention will become apparent to one with skill in the art upon examination of the following drawings and detailed description. It is intended that all such additional features and advantages be included herein within the scope of the present invention, as is defined by the claims.

DETAILED DESCRIPTION OF THE PREFERRED EMBODIMENT

Reference is now made to the drawings wherein like reference numerals designate corresponding parts throughout these several figures. It should be understood by those skilled in the art that some aspects of the present invention may be practiced on any apparatus for the purpose of viewing an image and is not limited to apparatuses which include or do not include image capturing capabilities through a photoelement array or scanning. For example, a user may use the present invention for viewing pages on the World Wide Web (WWW) or other network using some communication device.

Architecture of the Image Capture and Communication Appliance

Figure 1A:
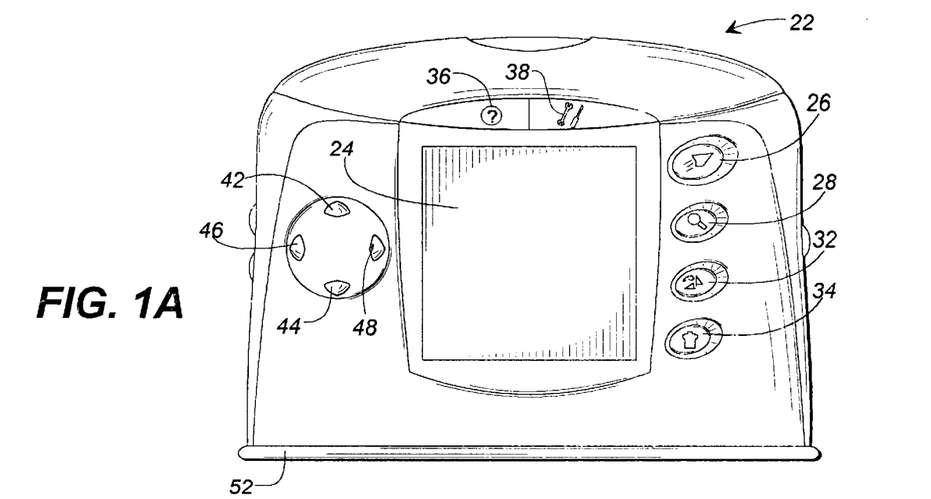
FIG. 1A is an elevation view of the hand-held image capturing appliance according to the present invention, showing a side of the unit containing the self contained display screen, operation buttons and navigation buttons.
Figure 1B:
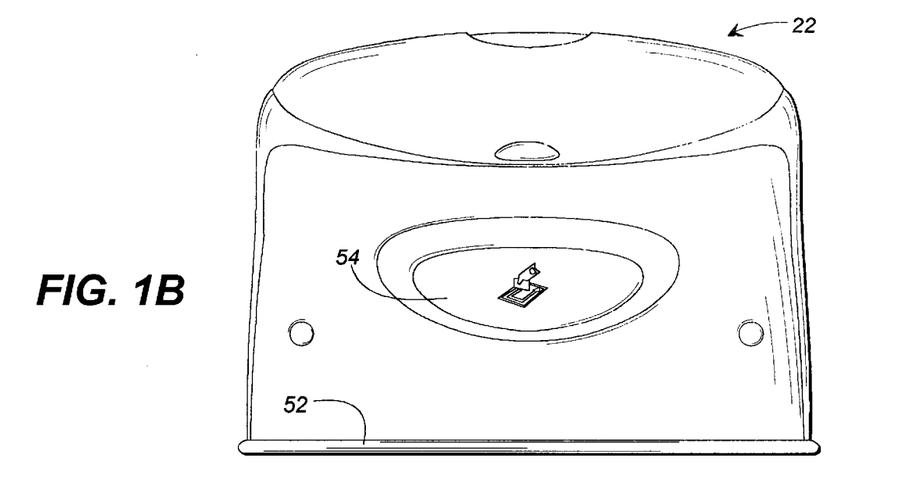
FIG. 1B is an elevation view of the hand-held image capturing appliance according to the present invention, showing a side of the unit containing the capture button for initiating image capturing.
Figure 1C:
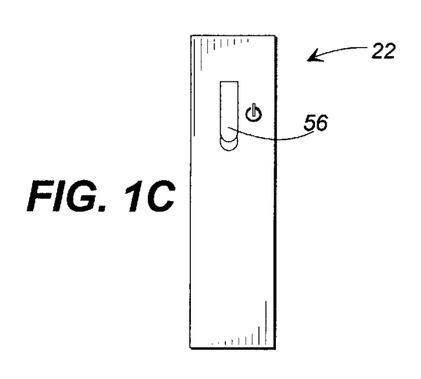
FIG. 1C is an elevation view of the hand-held image capturing appliance according to the present invention, showing a side of the unit containing the power button.
Figure 1D:
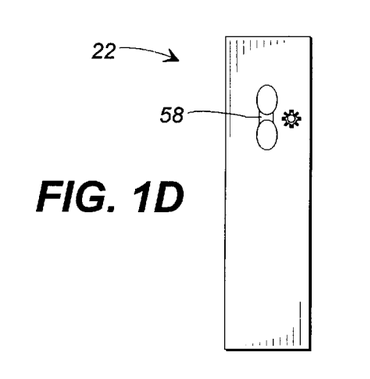
FIG. 1D is an elevation view of the hand-held image capturing appliance according to the present invention, showing the side of the unit containing a brightness button for adjusting the visual clarity of the self-contained display of the appliance.

A portable, hand-held, image capture and communication appliance 22 embodying the principles of the present invention is shown in FIGS. 1A through 1D. Specifically, FIG. 1A depicts one side (i.e., front) of appliance 22 where a flat-panel display 24 along with user operation buttons 26, 28, 32, 34, 36, 38 and user navigation buttons 42, 44, 46, 48 are located. Display 24 is preferably of the flat-panel variety to accommodate the hand size dimensions of appliance 22. Common types of flat-panel displays suitable for use in the present invention include electroluminescent displays, gas plasma discharge displays, liquid crystal displays (LCDs) and field emission displays (FEDs). Display 24 is the means by which information, including captured images, text, icons, and animations, is communicated to the user. The user operation buttons comprise an image send or transmit button 26, an image zoom button 28, an image rotate button 32, an image delete button 34, a help utility button 36 and a tools menu button 38. Send, zoom, rotate, and delete buttons 26, 28, 32 and 34 allow the user to electronically manipulate an image or page that has been scanned into memory through photoelement array 52. Activation of tools button 38 presents the user with a menu that includes possible image operations (e.g., image attachment/grouping, image detachment/ungrouping), changing the mode of appliance 22 (i.e., toggling between text (binary) capture and image (grayscale) capture), calibrating appliance 22, displaying a screen identifying important specifications such as a model number, hardware or software release number, memory usage, selecting a page size for printing, etc., or other user utilities not deserving of a dedicated external button for activation. Help button 36 provides the user with access to general tutorials, process animation, and how-to instructions on the operation of appliance 22 and context sensitive instruction when requested while another operation or menu is active. The navigation buttons include an up button 42, a down button 44, a left button 46, and a right button 48 and are controlled by the user to steer a course through menu items and to view images or pages that have been captured in memory. FIG. 1B shows the side of appliance 22 opposite that illustrated in FIG. 1A (i.e., back). The back side of appliance 22 includes image capture button 54, which is depressed by a user to scan an image through photoelement array 52 and is released once the image is captured. A power switch 56 is included at one end of appliance 22 as shown in FIG. 1C and a contrast control 58 for display 24 is located at the other end of appliance 22 as shown in FIG. 1D. The positioning of the various buttons, power switch 56 and contrast control 58 on appliance 22 as shown in FIGS. 1A through 1D is merely exemplary and can be modified as needed to satisfy the ergonomic requirements of the targeted user community.

Figure 2:
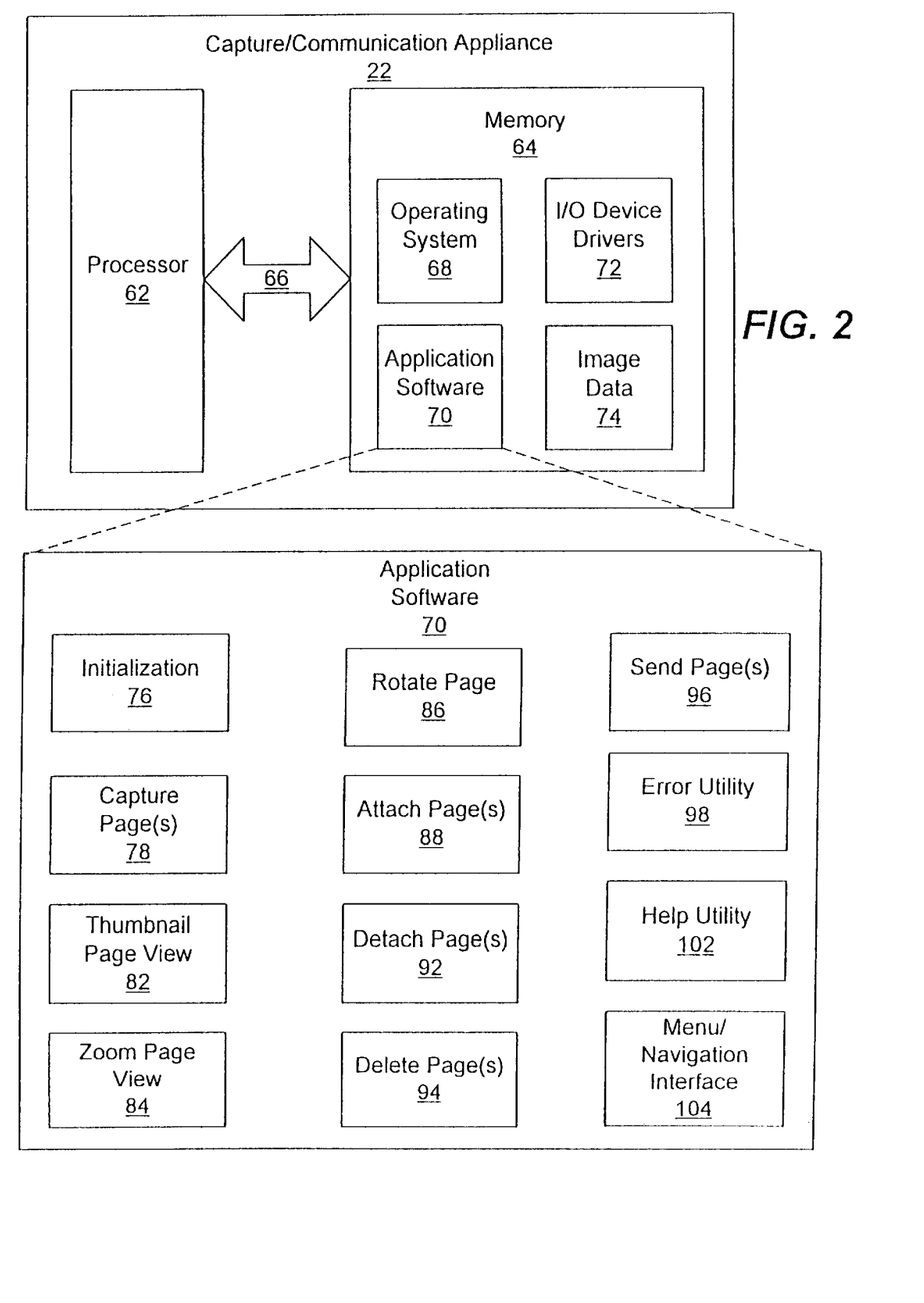
FIG. 2 is a block diagram illustrating the internal hardware and software architecture of the capturing appliance of FIGS. 1A through 1D.

Referring now to FIG. 2, the internal architecture of appliance 22 will be described hereafter. Appliance 22 includes a processor 62, which communicates with a memory 64 via address/data bus 66. Processor 62 can be any commercially available or custom microprocessor suitable for an embedded application. Memory 64 is representative of the overall hierarchy of memory devices containing the software and data used to implement the functionality of appliance 22. Memory 64 can include, but is not limited to, the following types of devices: cache, ROM, PROM, EPROM, EEPROM, flash, SRAM, and DRAM. As shown in FIG. 2, memory 64 holds four major categories of software and data used in appliance 22: the operating system 68; the application software 70; the I/O device drivers 72; and the image data 74 generated for each scan. Operating system 68 should be designed for real time embedded applications and, preferably, is relatively compact to make the most efficient use of memory 64. One such example of a real time operating system meeting these criteria is the PSOSYSTEM operating system (pSOSystem® or pSOS®) sold by Integrated Systems, Inc., Santa Clara, Calif., U.S.A., which is used in the preferred embodiment of the present invention.

I/O device drivers 72 include software routines accessed through operating system 66 by application software 70 to communicate with devices such as display 24, certain memory components 64 and I/O ports such as a serial port or infra red (IR) port for transferring data to another appliance, device or system. The digital representations of the images captured by appliance 22 is denoted by image data 74. The format used for storing the images should be compatible with application software 70. One common format used for encoding images is the JPEG standard; however, other public or proprietary standards can be used with equal success. In the preferred embodiment, CCITT-G4, which is designed for facsimile usage and black and white images, is used. Finally, application software 70 comprises the control programs that implement the various features of appliance 22. Application software 70 and devices drivers 72 are typically written in a high-level programming language such as C or C++ for development convenience. Nevertheless, some drivers or application modules are sometimes written in assembly or machine language to optimize speed, memory usage or layout of the software in memory. In the preferred embodiment, the present invention uses C language to implement most application software 70 and device drivers 72 and assembly language for the most time-critical sections.

Application software 70 can be broken into several modules corresponding to the various features of appliance 22, as shown in FIG. 2. These software modules include an initialization module 76, a capture page module 78, a thumbnail view module 82, a zoom view module 84, a page rotation module 86, an attach page module 88, a detach page module 92, a delete page module 94, a send page module 96, an error utility module 98, a help utility module 102 and a menu/navigation interface module 104. Note that an image captured in memory is interchangeably referred to herein as a "page" because the image is portrayed in appliance 22 as a physical page of text and/or imagery. A brief overview of each of the aforementioned modules follows hereafter.

Figure 8A:
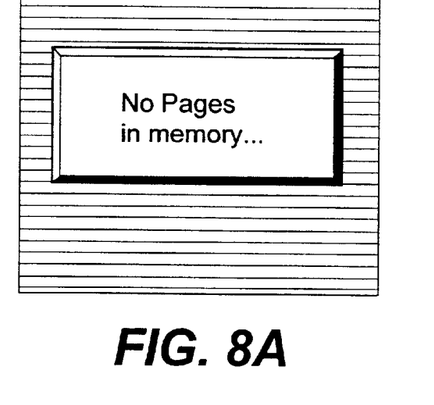
FIGS. 8A and 8B depict memory usage indicator icons on the display screen of FIG. 1A that provide a memory utilization report for the appliance.
Figure 8B:
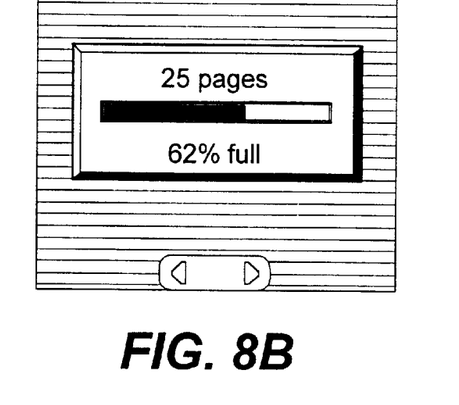
Figure 8C:
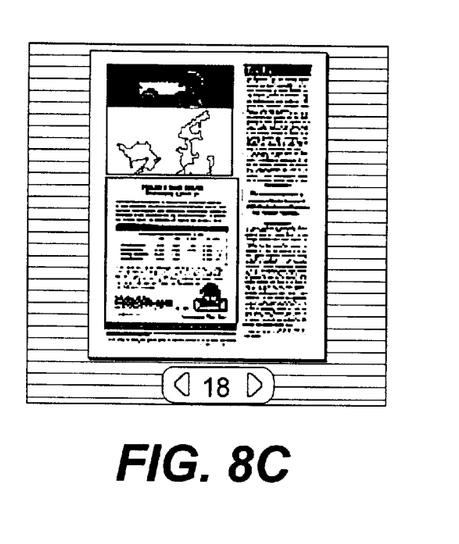
FIG. 8C illustrates a thumbnail view of a captured image on the display screen of FIG. 1A.
Figure 8D:
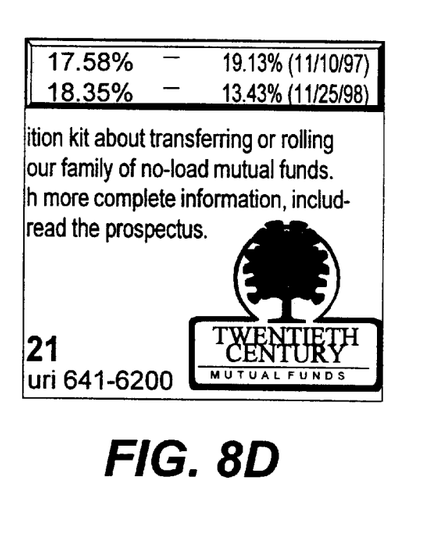
FIG. 8D illustrates a zoom view of a captured image on the display screen of FIG. 1A.

Initialization module 76 contains the boot software that is invoked when appliance 22 powers up. This module works closely with operating system 68 and device drivers 72 to perform any hardware initialization for processor 62, memory devices 64, display 24, and software initialization for global resources, such as message queues and buffers, system tasks, and memory partitions. Capture page module 78 controls the acquisition of images through photoelement array 52 and their conversion into a suitable format for storage in memory 64. Thumbnail view module 82 provides the default visual for pages and icons shown on display 24. The thumbnail view presents an entire page on display 24 as illustrated in FIG. 8C. Zoom view module 84 allows the user to magnify a portion of a page as illustrated in FIG. 8D. The operation of the zoom view module 84 will be discussed in detail hereinafter. Page rotation module 86 allows the user to rotate a page either in thumbnail or zoom view in 90° increments. Attach page module 88 allows the user to logically join pages together to form a group of pages that can be deleted, sent or viewed as an individual unit, but not rotated or zoomed. Rotation and zoom always apply only to the current page. Conversely, detach page module 92 allows the user to separate a page or pages from a previously formed group. Send page module 96 allows the user to transfer a page or group of pages to another appliance, device or system through the serial or IR communication ports of appliance 22. Error utility module 98 provides notification to the user when the user attempts an invalid operation. Help utility module 102 provides the user, in real time, with general instructions and animations on operating appliance 22 and context sensitive instructions for performing a specific operation. Lastly, menu/navigation interface module 104 provides the user with graphical menus for performing various operations and processes the user's response thereto. Moreover, menu/navigation interface module 104 responds to navigation buttons 42, 44, 46, and 48 that allow the user to steer a course through the graphical menus and view the stored pages.

Figure 3:
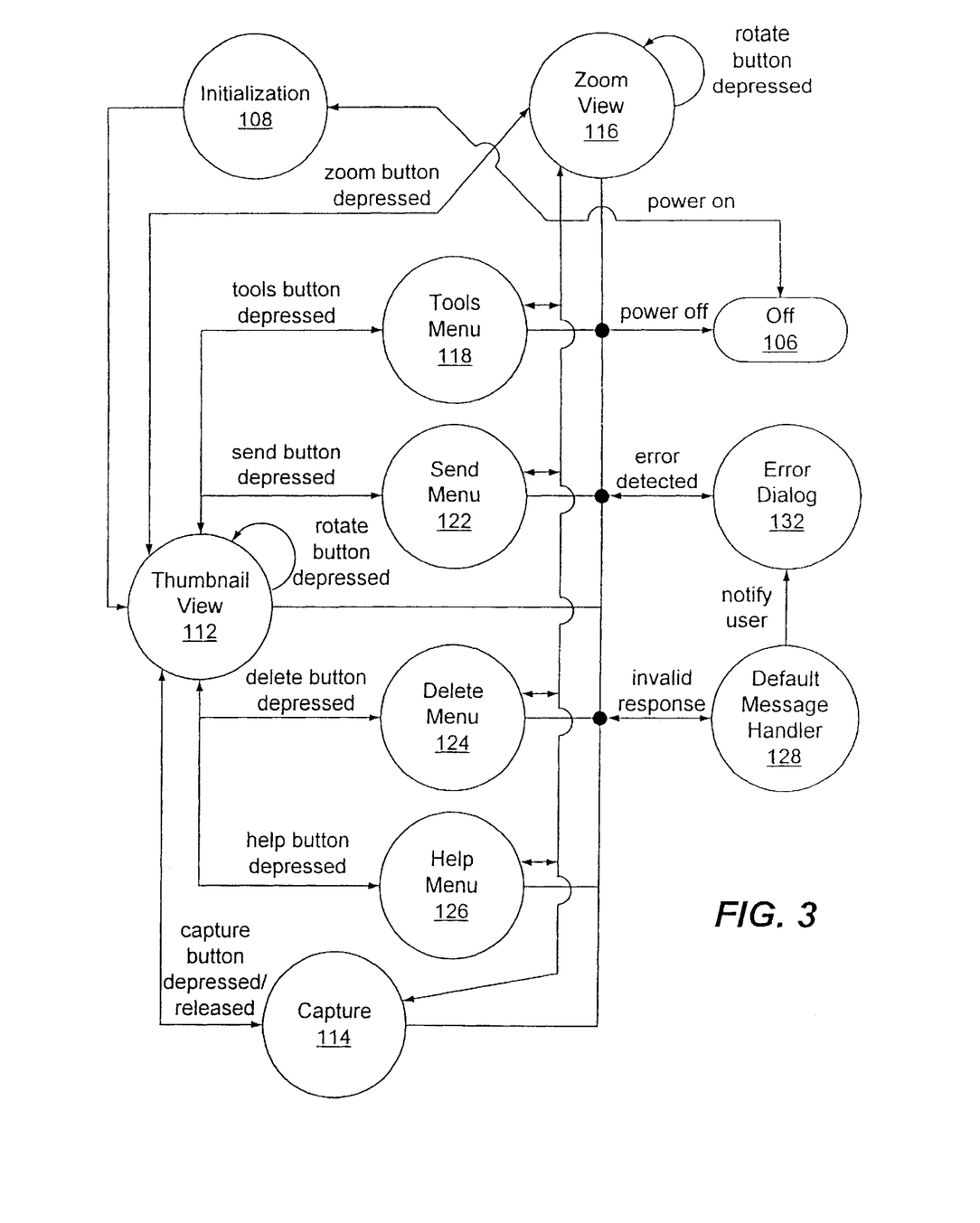
FIG. 3 is a high-level state diagram of the application software of FIG. 2.

A high level state diagram for application software 70 is shown in FIG. 3. This state diagram is useful for gaining a broad understanding of the operation of application software 70 and its associated software modules. These states are representative of tasks or processes in application software 70 that act on messages from a message queue, which are generated as a result of user interaction with appliance 22 (i.e., activation of buttons). Appliance 22 and application software 70 begin and terminate from the off state 106, which is controlled by the user through operation of power switch 56. Off state 106 can clearly be entered from any other state in response to a user turning appliance 22 off through switch 56. When a user turns switch 56 to the on position, the system will pass through a transient initialization state 108 during which time initialization module 76 is invoked to perform its functions. Once system initialization is complete, the system enters the thumbnail view state 112, which is the default state for viewing any captured images. From thumbnail view state 112, the system can transition to any one of several possible states depending on the action by the user. For example, the capture button can be pressed to enter capture state 114 to perform an image capture. After the image is captured, the button is released to return to thumbnail view state 112. If the user wishes to change the orientation of the captured image, then activation of rotation button 32 will rotate the captured image 90° with each invocation. Moreover, now that an image is captured in memory 64, a user can obtain a magnified view of a portion of the image or page by pressing zoom button 28 to enter zoom view state 116. Similar to thumbnail view state 112, the magnified image can also be rotated through application of rotation button 32. The system will return to thumbnail view state 112 through operation of zoom button 28 or performing certain actions such as capture, send, delete, attach, detach, etc. Additionally, the thumbnail view state 112 includes functionality for the empty (no images) state and the image verification state.

Figure 4A:
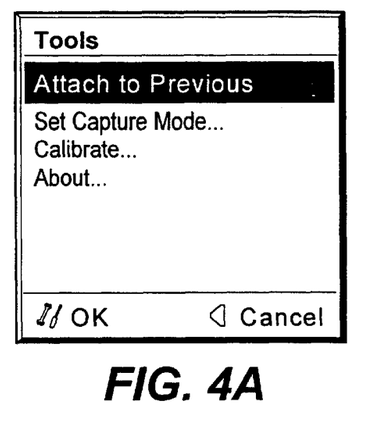
FIGS. 4A and 4B illustrate the tools menus displayed on the display screen of FIG. 1A.
Figure 4B:
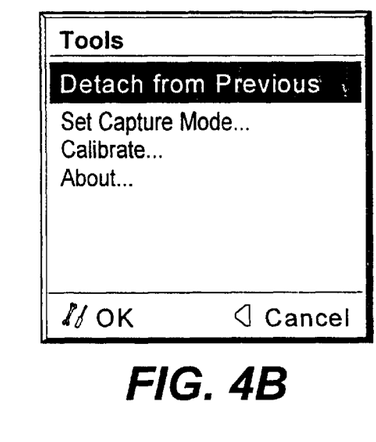
Figure 5:
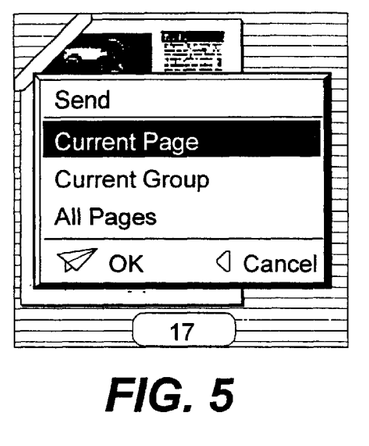
FIG. 5 illustrates the send menu displayed on the display screen of FIG. 1A.
Figure 6:
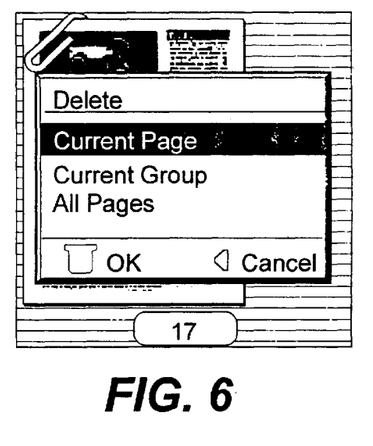
FIG. 6 illustrates the delete menu displayed on the display screen of FIG. 1A.
Figure 7:
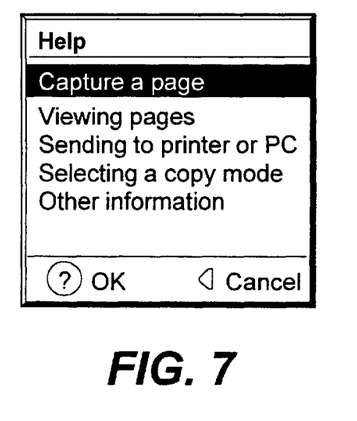
FIG. 7 illustrates the help menu displayed on the display screen of FIG. 1A.

From thumbnail view state 112, one of four menu states can be entered depending on the choice made by the user. First, activation of tools button 38 will transition the system into tools menu state 118 where a menu of possible page operations and/or features is exhibited on display 24 as illustrated in FIGS. 4A and 4B. Second, activation of send button 26 will transition the system into send menu state 122 where a menu of options for transferring a page or group of pages to another appliance, device or system is exhibited on display 24 as illustrated in FIG. 5. Third, activation of delete button 34 will transition the system into delete menu state 124 where a menu of options for deleting a page or group of pages from memory 64 is exhibited on display 24 as illustrated in FIG. 6. Lastly, activation of help button 36 will transition the system into help menu state 126 where a menu of help topics is exhibited on display 24 as illustrated in FIG. 7. Once any of the aforementioned menu states is reached, the user can choose a desired menu option by using navigation buttons 42 and 44 and then validating the choice by pressing a confirmation button. In the preferred embodiment of the present invention, the confirmation button is simply the button by which the present menu on display is accessed. An icon indicating the appropriate confirmation button is displayed in the lower left hand side of the menus as illustrated in FIGS. 4 through 7. Menu states may be exited by simply invoking navigation button 46 to transition to a previous state.

From some states, an invalid response by the user (i.e., user presses an inactive button) will be ignored or will result in a transition to the default message handler state 128 where the user response is interpreted through the message that was generated internally and a transition is made to the error dialog state 132 to notify the user of their error via a message or graphic on display 24. Inactive buttons will occasionally also display a blinking icon to communicate to the user the selection of the inactive button and which buttons are active. Alternatively, error dialog state 132 can be entered directly if application software 70 detects an error in the execution of a valid operation. The most common example of this is when the user follows an improper capture path with appliance 22 during the image capture process.

The features provided by the zoom view software module 84 will be described hereafter with frequent reference to (a) the architecture and operation of the application software 70 of FIG. 2; (b) the flow charts of FIGS. 9 and 10; and (c )the captured page illustrations of FIGS. 11A–11C and 12A–12C.

Operation of the Zoom View Feature

Recall from the state diagram of FIG. 3 that when power is provided via switch 56 (FIG. 1C) application software 70 passes through a transient initialization state 108 to reach thumbnail view state 112, which is the default state for viewing images captured using capture button 54. The captured image is displayed as a thumbnail size icon on the display 24 (FIG. 1A). Although the image has been stored in memory, the thumbnail sized icon of the image is not displayed in readable form, but as a miniature version of the full size object. Hence, for the user to confirm if a capture was successful, the user may need to view a "close-up" of the acquired image. The zoom button 28 is provided on the appliance 22 (FIGS. 1A–1D) to execute a zoom into a specific area of the captured image designated by another icon capable of navigation. In the preferred embodiment, an area designating icon is metaphorically a magnifying glass. Once the zoom button 22 is depressed and held, the appliance 22 (FIGS. 1A–1D) enters a zoom view state 116, where the navigation buttons 42, 44, 46, and 48 are activated to position the metaphoric icon over a specific area of the captured image to be magnified. When the zoom button is released the magnifying glass disappears and a zoomed view is generated.

Figure 9:
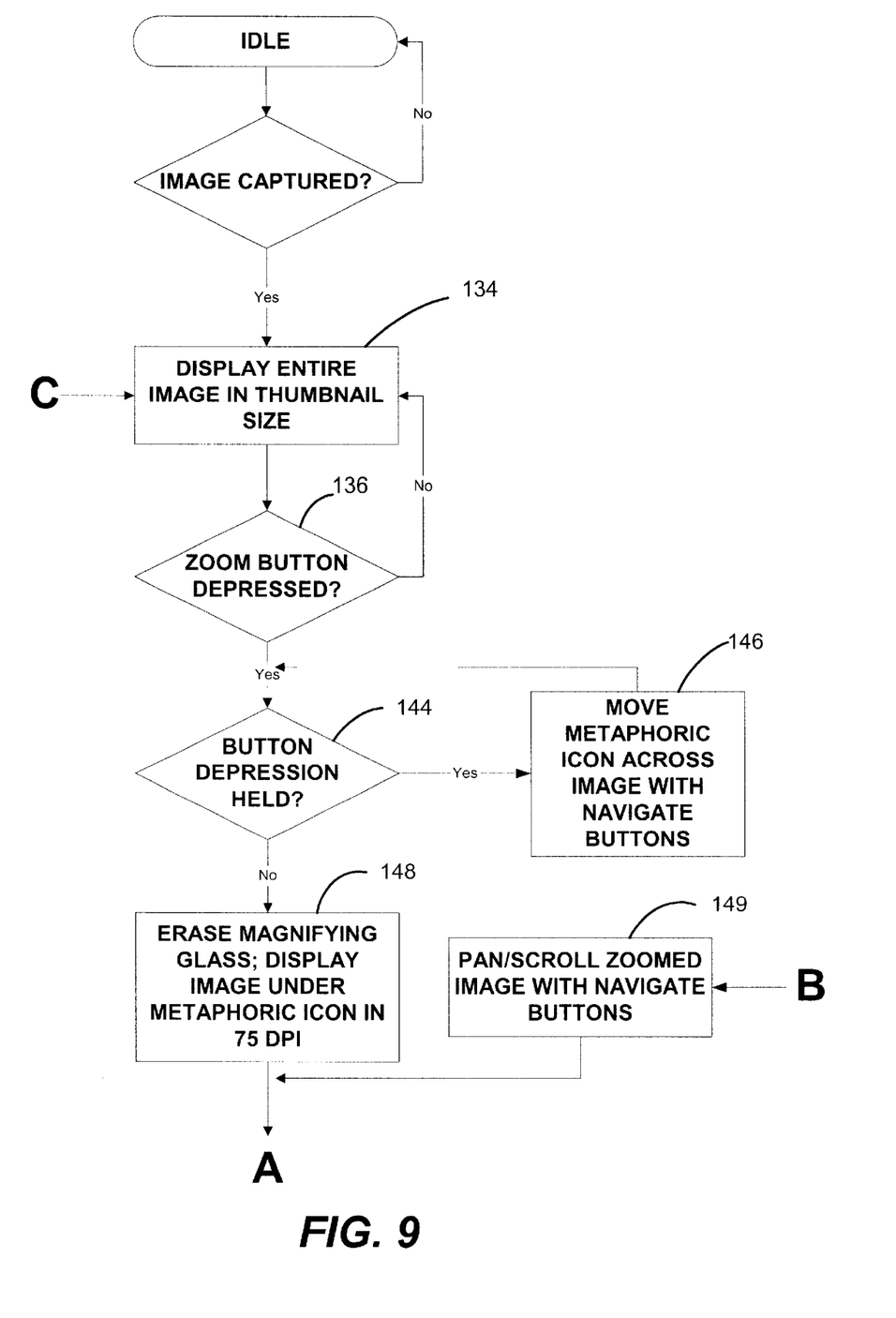
FIG. 9 and FIG. 10 are functional flowcharts illustrating one embodiment of the present invention as implemented in the zoom page view software module depicted in FIG. 2.
Figure 10:
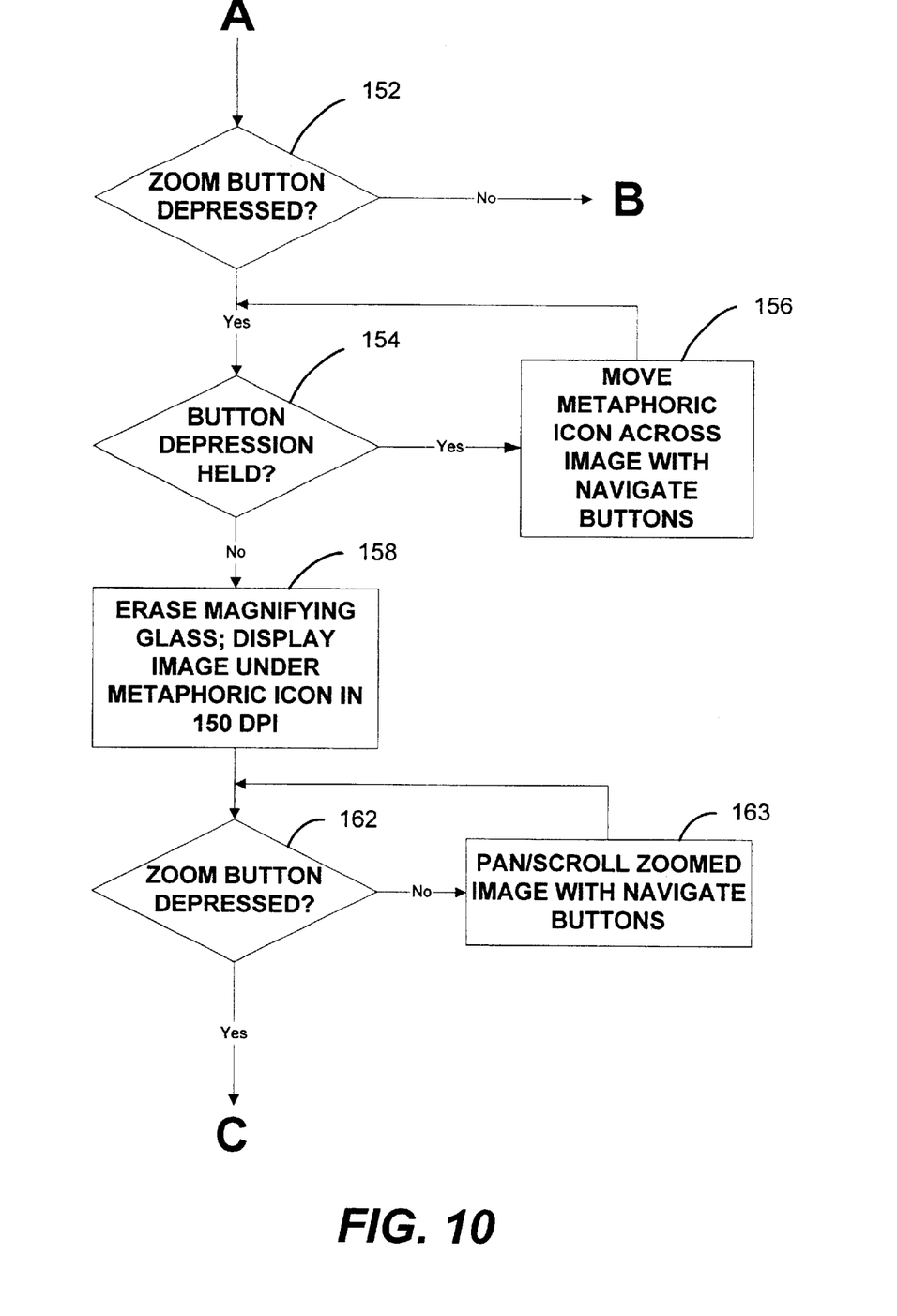
Figure 11A:
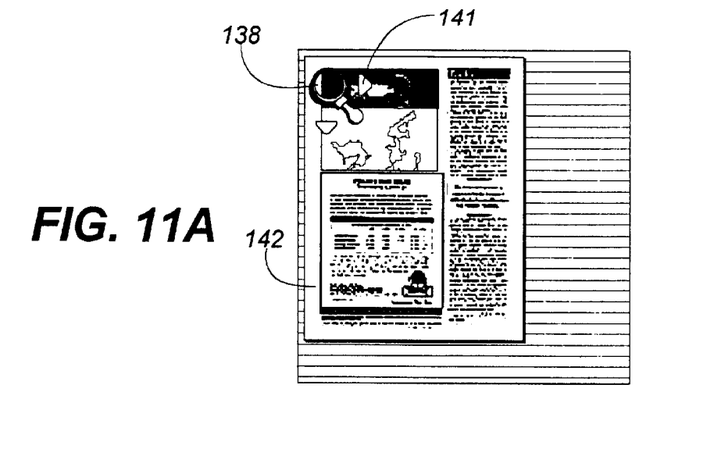
FIG. 11A illustrates a thumbnail view of a captured image displayed on the display screen of FIG. 1A.
Figure 11B:
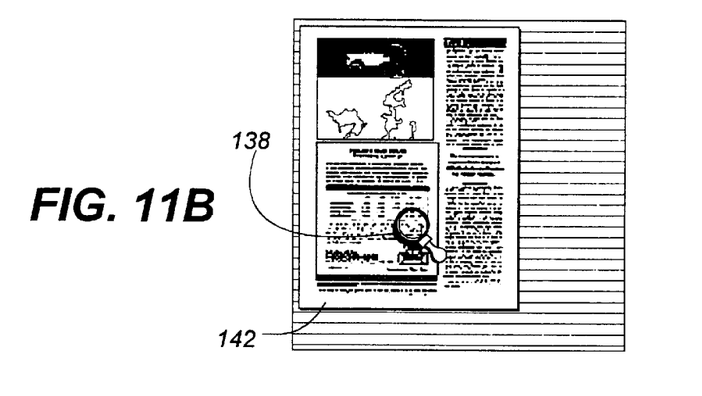
FIG. 11B illustrates the positioning of a metaphoric icon over a portion of a captured image as it is displayed on the display screen of FIG. 1A.
Figure 11C:
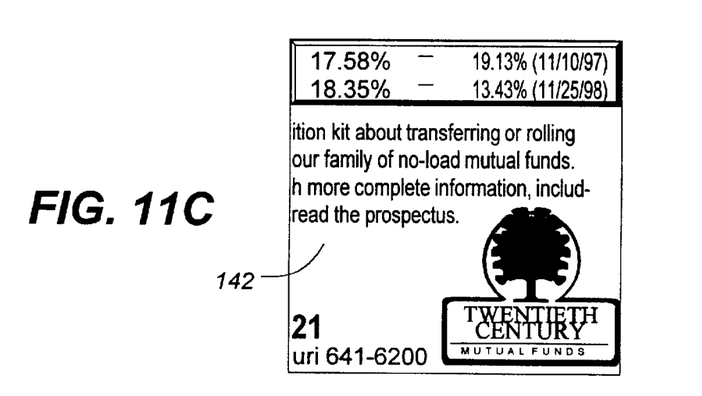
FIG. 11C illustrates a magnified view of a portion of a captured image designated in FIG. 6B by the metaphoric icon as it is displayed on the display screen of FIG. 1A.

FIG. 9 and FIG. 10 are a functional flowchart of the zoom view state 116 of the state diagram of FIG. 3. Although there are limitless magnifications in which the image can be examined, the preferred embodiment of the invention implements only two magnifications. An image may be magnified to 75 dpi or 150 dpi on the display 24 (FIG. 1A) of the appliance 22 (FIGS. 1A–1D) based on user input. In FIG. 9, after the image is captured, a thumbnail sized image of the captured image is displayed on the display 24 (FIG. 1A) of the appliance 22 (FIGS. 1A–1D) in step 134. Menu/navigation interface module 104 (FIG. 2) then checks for a message indicating that zoom button 28 (FIG. 1A) has been depressed at decision diamond 136. If zoom button 28 is depressed and held, zoom view software module 84 updates display 24 (FIG. 1A) as shown in FIG. 11A. This view indicates that the zoom button 28 (FIG. 1A) has been depressed as the magnifying glass, the metaphoric icon 138 of choice for the preferred embodiment, accompanied by navigational arrows 141, are displayed in the upper left hand edge of the captured image 142. Navigational arrows 141 communicate to the user that the magnifying glass metaphoric icon 138 may only be moved down and right in specifying an area to magnify.

At decision diamond 144, menu/navigation interface module 104 determines if zoom button 28 is being held down. At the depression of the zoom button 28 (FIG. 1A), the metaphoric icon appears surrounded by navigational arrows. In the preferred embodiment, the magnifying glass icon is automatically placed at the top left corner of the captured image as a starting reference point. Only right and down navigation arrows are displayed. If zoom button 28 (FIG. 1A) is held down, this communicates to the user that the metaphoric icon can only be moved in these directions as it is at the upper left edge of the captured image. Once the user moves the metaphoric icon, these directional arrows disappear in the preferred embodiment and the metaphoric icon floats freely across the captured image as long as the zoom button 28 (FIG. 1A) is held down as indicated by step 146. FIG. 1B illustrates the positioning of the metaphoric icon 138 over a portion of a captured image on the display 11 (FIG. 1A) to be magnified, using the navigation buttons 42, 44, 46, and 48 (FIG. 1A). This illustrates step 146 (FIG. 9) as the metaphoric icon 138 is visible without navigational arrows 141 (FIG. 11A) and the image has not been magnified to 75 dpi, indicating that the zoom button 28 (FIG. 1A) is being held down for navigation.

Once zoom button 28 is released, the area designated under the metaphoric icon is zoomed to 75 dpi in step 148 using exploding animation and is centered on the display 24 (FIG. 1A). Further, the metaphoric icon disappears from the display 24 (FIG. 1A) as shown in FIG. 1C.

Figure 12A:
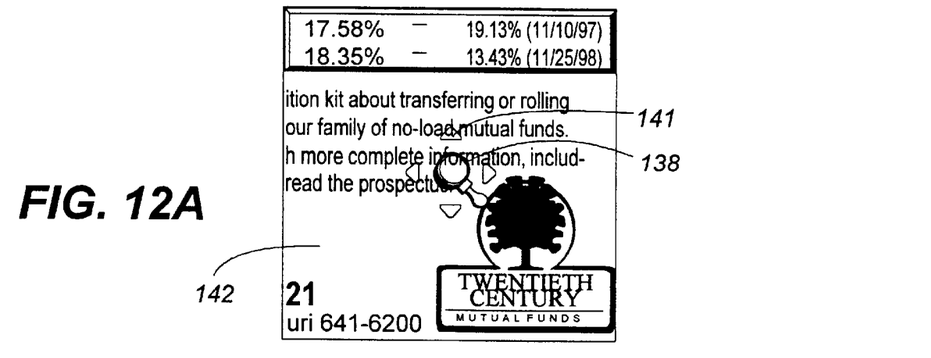
FIG. 12A illustrates the appearance of the metaphoric icon on the display screen of FIG. 1A surrounded by directional arrows indicating that the metaphoric icon is capable of movement by the navigation keys of FIG. 1A.

In FIG. 10, menu/navigation module interface module 104 checks for another zoom button 28 (FIG. 1A) depression at decision diamond 152. While waiting for the zoom button to be depressed again, the navigational buttons 42, 44, 46 and 48 pan or scroll the image if depressed 149. At the second depression of the zoom button 28 (FIG. 1A), the metaphoric icon 138 reappears on the image with surrounding navigational arrows 141 as shown in FIG. 12A. This indicates that metaphoric icon 138 is capable of movement in all directions by navigation buttons 42, 44, 46, and 48.

Figure 12B:
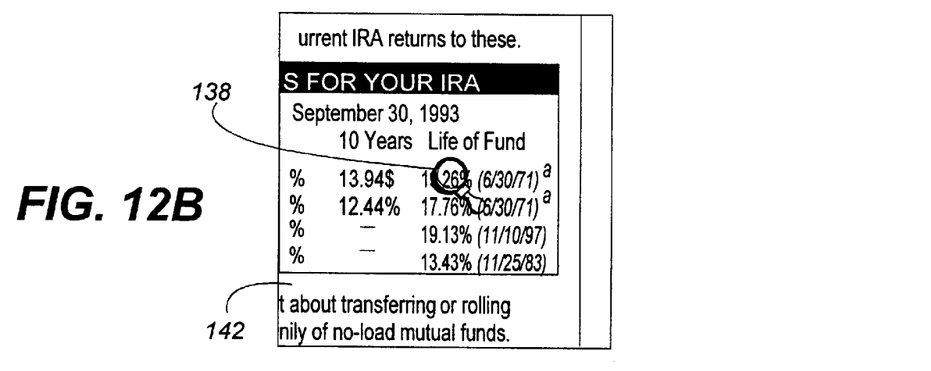
FIG. 12B illustrates the maneuvering and positioning of the metaphoric icon by the navigation keys of FIG. 1A over a portion of the magnified image of FIG. 11C as it is displayed on the display screen of FIG. 1A.
Figure 12C:
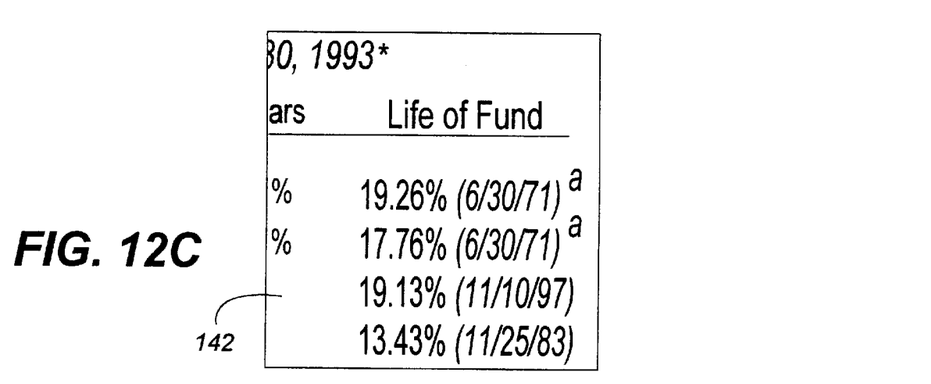
FIG. 12C illustrates a magnified view of a portion of a captured image designated in FIG. 12B by the metaphoric icon as it is displayed on the display screen of FIG. 1A.

If the zoom button 28 (FIG. 1A) is depressed and held 154, the metaphoric icon may again be navigated across the image in step 156 to a specific area in the direction of any navigational arrow, only this time, with the image being displayed in 75 dpi as illustrated in FIG. 12B. Once the zoom button 28 (FIG. 1A) is released, the area of the captured image designated under the metaphoric icon is magnified to 150 dpi in step 158, once again centered and displayed on the display 24 (FIG. 1A), using exploding animation as shown in FIG. 12C. In this view, while waiting for the zoom button to be depressed again, the navigational buttons 42, 44, 46 and 48 again pan or scroll the image 163.

Menu/navigation module 104 then checks again for a zoom button 28 (FIG. 1A) depression at decision diamond 162. Once the zoom button 28 (FIG. 1A) is depressed again, then the process returns to step 134 where the image is displayed once again in the thumbnail view using unexploding animation to communicate to the user that a reduction of the image size has occurred. Captures are stored automatically when they become viewable.

Thus, the user has the option again to view any area of the captured image 142 in any of the two magnifications using the zoom button 28 (FIG. 1A) and the navigation buttons 42, 44, 46, and 48 (FIG. 1A). At any time, the user has the option of deleting the captured image 142 by invoking delete page module 94 through the delete button 34 (FIG. 1A) or initiating the capture of another image using the capture button 54 (FIG. 2).

The zoom page view program 84 of the present invention can be implemented in hardware, software, firmware, or a combination thereof. In the preferred embodiment(s), the zoom page view program 84 is implemented in software or firmware that is stored in a memory 64 and that is executed by a suitable instruction execution system.

The zoom page view program 84, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory 64.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

What is claimed is:

1. A portable hand-held image capturing appliance, comprising:

means for capturing an image;

means for storing said image;

means for processing said image in said storage means;

means for displaying said image;

said storing means having program code for manipulating and viewing said image stored in said storing means in a plurality of pixel resolutions on said displaying means;

means for positioning a metaphorical icon over a portion of said image, such that said portion of said image may be selected for magnification; and means for magnifying said selected portion of said image, wherein said program code displays said metaphorical icon on said display means, and wherein said program code controls the positioning of said metaphorical icon over said portion of said image, for manipulating and viewing said image stored in said storage means.

2. The capturing appliance of claim 1, wherein said metaphorical icon is a magnifying glass icon.

3. The capturing appliance of claim 1, wherein said program code displays an animated transition of a specified area designated by said metaphorical icon of said image from an unexploded state to an exploded state when a first pixel resolution of said displayed image is less than a second pixel resolution of said image to be displayed on said display means.

4. The capturing appliance of claim 1, wherein said program code displays an animated transition of said image from an unexploded state to an exploded state when a first pixel resolution of said displayed image is less than a second pixel resolution of said image to be displayed on said display means.

* * * * *